(12) United States Patent
Sakai

(10) Patent No.: US 12,462,982 B2
(45) Date of Patent: Nov. 4, 2025

(54) MULTILAYER CERAMIC ELECTRONIC COMPONENT, METHOD OF MANUFACTURING THE SAME, AND CIRCUIT BOARD

(71) Applicant: TAIYO YUDEN CO., LTD., Tokyo (JP)

(72) Inventor: Tomoki Sakai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 317 days.

(21) Appl. No.: 18/192,515

(22) Filed: Mar. 29, 2023

(65) Prior Publication Data
US 2023/0326682 A1    Oct. 12, 2023

(30) Foreign Application Priority Data

Apr. 12, 2022 (JP) ................................. 2022-065487

(51) Int. Cl.
*H01G 4/30* (2006.01)
*H01G 4/005* (2006.01)
*H01G 4/12* (2006.01)
*H05K 1/16* (2006.01)

(52) U.S. Cl.
CPC ............. *H01G 4/306* (2013.01); *H01G 4/005* (2013.01); *H01G 4/12* (2013.01); *H05K 1/162* (2013.01)

(58) Field of Classification Search
CPC .......... H01G 4/306; H01G 4/005; H01G 4/12; H01G 4/162; H01G 4/30
See application file for complete search history.

(56) References Cited

U.S. PATENT DOCUMENTS

| | | | |
|---|---|---|---|
| 2009/0195960 A1* | 8/2009 | Sato | C04B 35/638 501/138 |
| 2014/0204502 A1* | 7/2014 | Chun | H01G 4/30 361/301.4 |
| 2016/0086733 A1 | 3/2016 | Saito et al. | |
| 2016/0268046 A1* | 9/2016 | Nishisaka | H01G 4/232 |
| 2019/0318876 A1* | 10/2019 | Matsushita | H01G 4/232 |
| 2020/0066450 A1* | 2/2020 | Uenishi | H01G 4/012 |
| 2021/0035744 A1* | 2/2021 | Atsumi | H01G 4/30 |
| 2021/0125780 A1 | 4/2021 | Hayashi et al. | |
| 2021/0175020 A1* | 6/2021 | Takei | H05K 1/185 |

FOREIGN PATENT DOCUMENTS

| | | |
|---|---|---|
| JP | 2016-066783 A | 4/2016 |
| JP | 2021-068851 A | 4/2021 |

* cited by examiner

*Primary Examiner* — Michael P McFadden
(74) *Attorney, Agent, or Firm* — CHEN YOSHIMURA LLP

(57) ABSTRACT

A multilayer ceramic electronic component includes a ceramic body that has internal electrodes stacked in a direction of a first axis, and end surfaces perpendicular to a second axis orthogonal to the first axis, the internal electrodes being alternately led out to the end surfaces, and external electrodes covering the end surfaces of the ceramic body, wherein each of the external electrodes includes a base film formed on a corresponding one of the end surfaces and connected to the plurality of internal electrodes, a first Ni film formed on the base film, a metal film that is formed on the first Ni film and contains a metal having a lower ionization tendency than Ni, as a main component, a second Ni film formed on the metal film and having a higher hydrogen concentration than the first Ni film, and a surface layer film formed on the second Ni film.

13 Claims, 6 Drawing Sheets

MULTILAYER CERAMIC ELECTRONIC COMPONENT, METHOD OF MANUFACTURING THE SAME, AND CIRCUIT BOARD

FIELD

A certain aspect of the present disclosure relates to a multilayer ceramic electronic component having external electrodes, a method of manufacturing the same, and a circuit board.

BACKGROUND

In general, the manufacturing process of multilayer ceramic capacitors includes a plating process for forming external electrodes. Hydrogen generated in this plating process tends to be occluded and remain in the external electrodes. In a multilayer ceramic capacitor, hydrogen in the external electrodes diffuses into the ceramic body, causing problems such as a decrease in insulation resistance.

Japanese Patent Application Laid-Open No. 2016-066783 (Patent Document 1) describes a method of manufacturing a multilayer ceramic capacitor in which a protective layer containing $Cu_2O$ is formed by oxidizing an external electrode body containing Cu, a Ni plating layer is formed on the protective layer, and heat treatment is performed under a temperature condition of 150° C. or higher after the formation of the Ni layer, and a Sn plating layer is formed after the heat treatment.

However, with the technique described in Patent Document 1, when the Ni plating layer is formed after the external electrode body is oxidized, there is a possibility that the adhesion between the protective layer, which is an oxide film, and the Ni plating layer decreases. Furthermore, the surface of the Ni plating layer after the heat treatment may be oxidized and become unstable. Therefore, by directly forming the Sn plating layer on the surface, there is a possibility that the adhesion of the Sn plating layer may be lowered and the wettability of the solder used for mounting onto a substrate may decrease.

Japanese Patent Application Laid-Open No. 2021-068851 (Patent Document 2) describes a technique in which two Ni plating layers are provided, that is, a second Ni plating layer is provided on a first Ni plating layer after heat treatment. In this technique, high adhesion between the Sn plating layer and the second Ni plating layer, which covers the first Ni plating layer whose surface is oxidized by heat treatment, can be obtained.

RELATED ART DOCUMENTS

Patent Documents

Japanese Patent Application Laid-Open No. 2016-066783
Japanese Patent Application Laid-Open No. 2021-068851

SUMMARY

However, in the technique described in Patent Document 2, the adhesion of the second Ni plating layer to the first Ni plating layer is hindered by the Ni oxide present on the surface of the first Ni plating layer. Therefore, in this technique, even if high adhesion of the Sn plating layer is obtained, the mechanical strength is likely to be lowered because of insufficient adhesion between the first Ni plating layer and the second Ni plating layer.

An object of the present disclosure is to provide a technique for obtaining high adhesion between layers in an external electrode having a multilayer structure of a multilayer ceramic electronic component.

In one aspect of the present disclosure, there is provided a multilayer ceramic electronic component including: a ceramic body that has a plurality of internal electrodes stacked in a direction of a first axis, and end surfaces perpendicular to a second axis orthogonal to the first axis, the plurality of internal electrodes being alternately led out to the end surfaces; and external electrodes covering the end surfaces of the ceramic body, respectively, wherein each of the external electrodes includes: a base film formed on a corresponding one of the end surfaces and connected to the plurality of internal electrodes that are led out to the corresponding end surface, a first Ni film formed on the base film, a metal film that is formed on the first Ni film and contains a metal having a lower ionization tendency than Ni, as a main component, a second Ni film formed on the metal film and having a hydrogen concentration higher than that of the first Ni film, and a surface layer film formed on the second Ni film.

In this multilayer ceramic electronic component, the first Ni film is covered with the metal film containing, as a main component, a metal that has a lower ionization tendency than Ni and is more difficult to oxidize than Ni. Therefore, by performing heat treatment after forming the metal film, it is possible to form the second Ni film having high adhesion to the surface of the metal film that is difficult to oxidize. In addition, since the plating efficiency is improved when the second Ni film is formed on the surface of the metal film on which a decrease in conductivity due to oxidation is unlikely to occur, the generation amount of hydrogen can be kept small. Therefore, it is possible to prevent deterioration in reliability due to diffusion of hydrogen into the ceramic body.

Specifically, the metal film may contain at least one of Pd, Pt, Au, Ag, Cu, or Sn as a main component.

Each of the external electrodes may further include a reaction layer that is formed between the first Ni film and the metal film and contains Ni and the metal contained in the metal film as a main component.

The thickness of the metal film may be 0.1 μm or greater and 1.0 μm or less.

The thickness of the first Ni film may be 1.0 μm or greater and 10.0 μm or less.

The thickness of the second Ni film may be 0.5 μm or greater and 10.0 μm or less.

The base film may contain Cu as a main component.

The thickness of the base film may be 2 μm or greater and 50 μm or less.

The surface layer film may contain Sn as a main component.

The thickness of the surface layer film may be 3 μm or greater and 10 μm or less.

In another aspect of the present disclosure, there is provided a method of manufacturing a multilayer ceramic electronic component, the method including: preparing a ceramic body having a plurality of internal electrodes stacked in a direction of a first axis, and end surfaces perpendicular to a second axis orthogonal to the first axis, the plurality of internal electrodes being alternately led out to the end surfaces; forming a base film on each of the end surfaces so as to be connected to the plurality of internal electrodes that are led out to the corresponding end surface; forming a first Ni film on the base film by electrolytic plating; forming a metal film on the first Ni film, the metal film containing a metal having a lower ionization tendency than Ni as a main component; forming a second Ni film on the metal film by electrolytic plating; and forming a surface layer film on the second Ni film, wherein before the forming of the second Ni film, the ceramic body on which the metal film is formed is subjected to heat treatment, in a weakly oxidizing atmosphere or a reducing atmosphere, at a temperature equal to or higher than a temperature at which the first Ni film is recrystallized.

Specifically, the temperature of the heat treatment may be 450° C. or higher and 800° C. or lower.

In another aspect of the present disclosure, there is provide a circuit board including: a mounting substrate; a multilayer ceramic electronic component that includes: a ceramic body having a plurality of internal electrodes stacked in a direction of a first axis, and end surfaces perpendicular to a second axis orthogonal to the first axis, the plurality of internal electrodes being alternately led out to the end surfaces, and external electrodes covering the end surfaces of the ceramic body, respectively; and solder that connects the external electrodes to the mounting substrate, wherein each of the external electrodes includes: a base film formed on a corresponding one of the end surfaces and connected to the plurality of internal electrodes that are led out to the corresponding end surface, a first Ni film formed on the base film, a metal film that is formed on the first Ni film and contains a metal having a lower ionization tendency than Ni, as a main component, a second Ni film that is formed on the metal film and has a hydrogen concentration higher than that of the first Ni film, and a surface layer film formed on the second Ni film.

DETAILED DESCRIPTION

Figure 1:
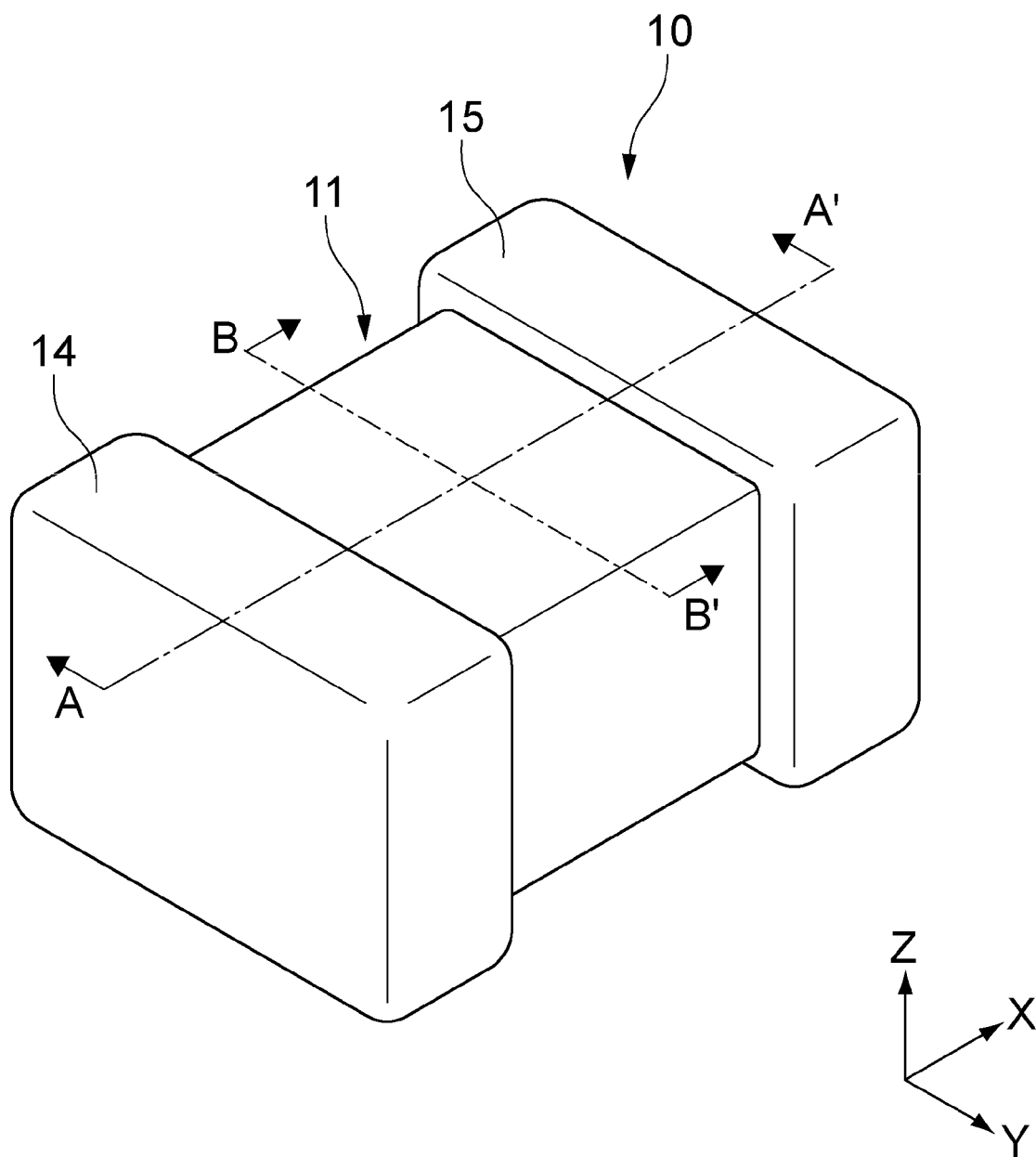
FIG. 1 is a perspective view schematically illustrating a multilayer ceramic capacitor in accordance with an embodiment.

Hereinafter, embodiments of the present disclosure will be described with reference to the drawings. In the drawings, the X-axis, the Y-axis, and the Z-axis that are orthogonal to each other are illustrated as appropriate. The X-axis, the Y-axis, and the Z-axis are common in all drawings.

Configuration of a Multilayer Ceramic Capacitor 10

Figure 2:
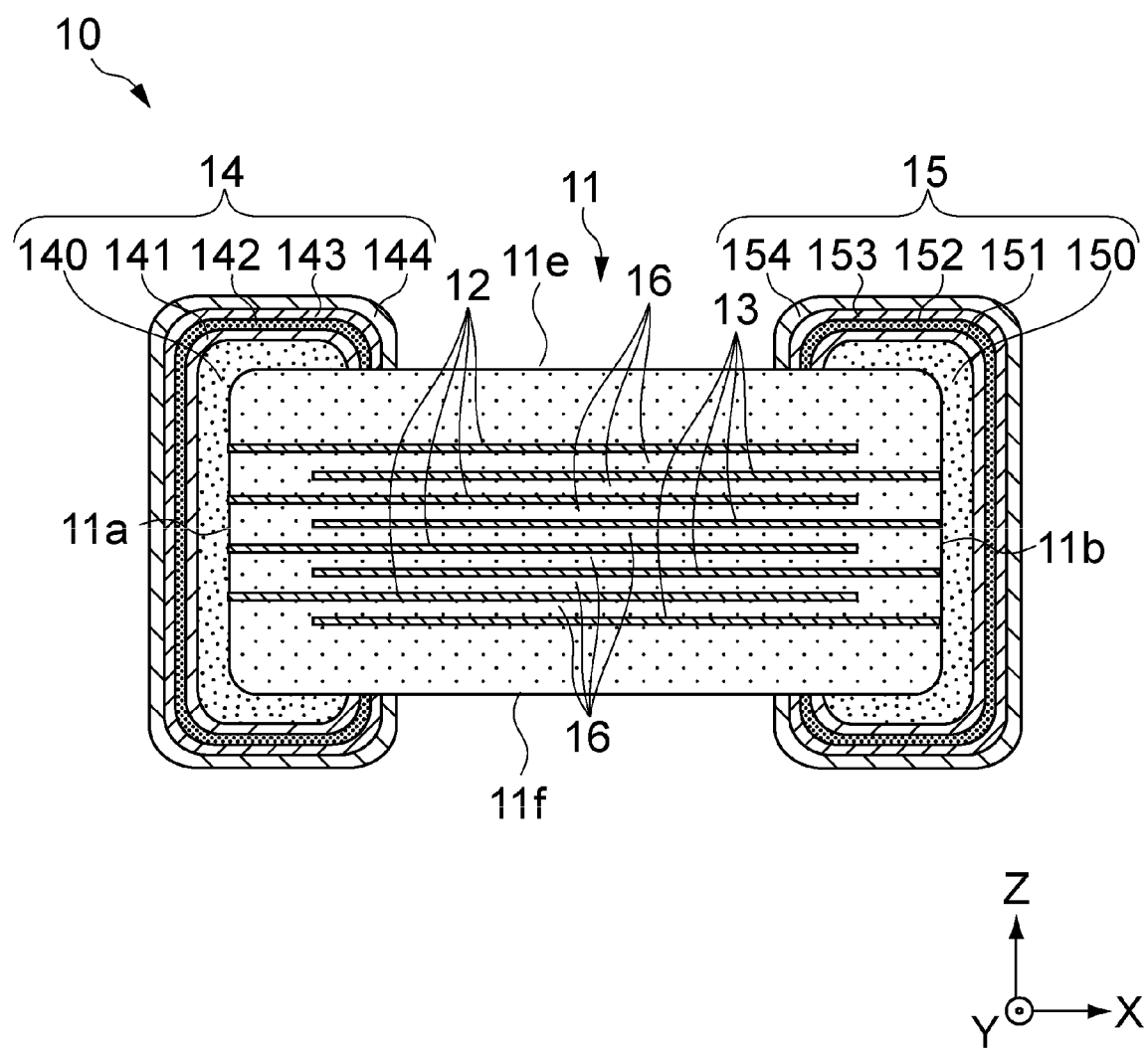
FIG. 2 is a cross-sectional view of the multilayer ceramic capacitor taken along line A-A' in FIG. 1.
Figure 2:
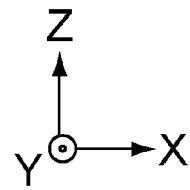
Figure 3:
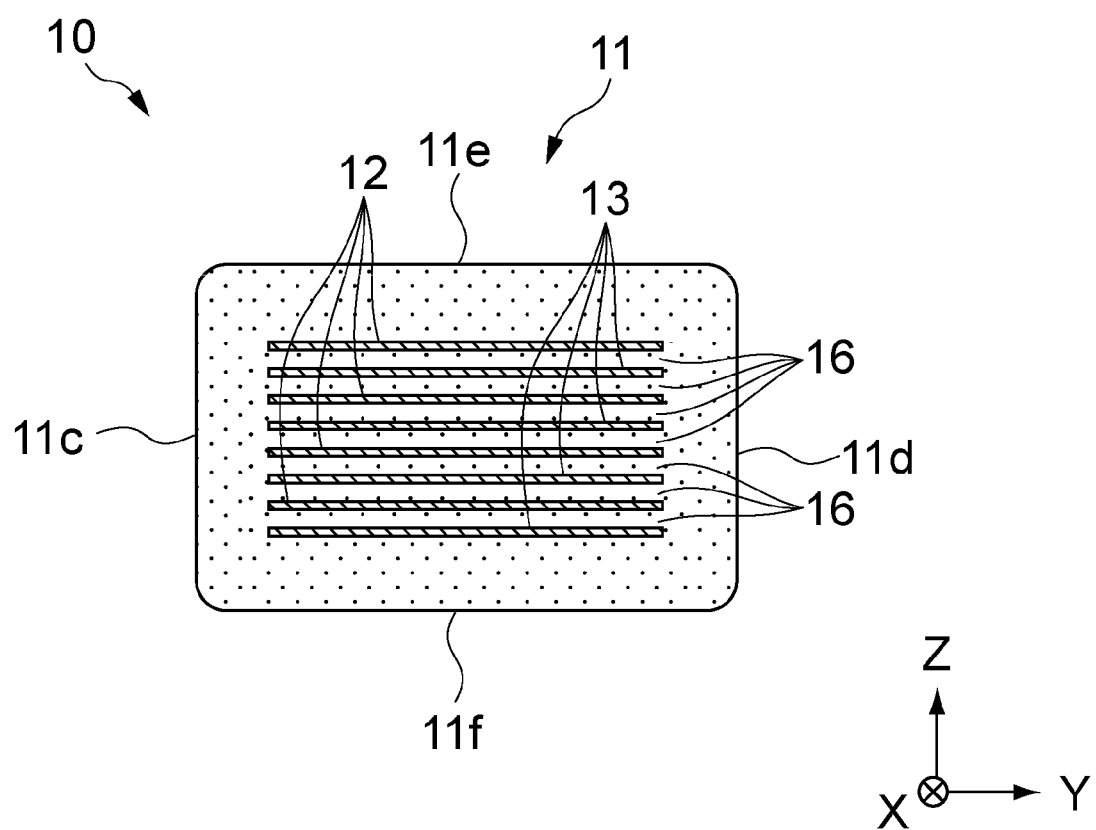
FIG. 3 is a cross-sectional view of the multilayer ceramic capacitor taken along line B-B' in FIG. 1.

FIG. 1 to FIG. 3 illustrate the multilayer ceramic capacitor 10 in accordance with an embodiment. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 14, and a second external electrode 15. The surfaces of the ceramic body 11 typically include a first end surface 11a and a second end surface 11b facing the X-axis direction, a first side surface 11c and a second side surface 11d facing the Y-axis direction, and a first principal surface 11e and a second principal surface 11f facing the Z-axis direction. More specifically, the first end surface 11a faces a direction parallel to the X-axis direction, and the second end surface 11b faces a direction that is parallel to the X-axis direction and opposite to the direction that the first end surface 11a faces. The first side surface 11c faces a direction parallel to the Y-axis direction, and the second side surface 11d faces a direction that is parallel to the Y-axis direction and opposite to the direction that the first side surface 11c faces. The first principal surface 11e faces a direction parallel to the Z-axis direction, and the second principal surface 11f faces a direction that is parallel to the Z-axis direction and opposite to the direction that the first principal surface 11e faces. The first end surface 11a and the second end surface 11b extend along the Y-axis direction and the Z-axis direction. The first side surface 11c and the second side surface 11d extend along the Z-axis direction and the X-axis direction. The first principal surface 11e and the second principal surface 11f extend along the X-axis direction and the Y-axis direction.

The first end surface 11a and the second end surface 11b, the first side surface 11c and the second side surface 11d, and the first principal surface 11e and the second principal surface 11f of the ceramic body 11 are all flat surfaces. The flat surface in the present embodiment does not have to be strictly a flat surface as long as it is recognized as flat when viewed as a whole, and includes a surface having a minute uneven shape on the surface and a surface having a gently curved shape.

The ceramic body 11 has ridge portions connecting the first and second end surfaces 11a and 11b, the first and second side surfaces 11c and 11d, and the first and second principal surfaces 11e and 11f. The ridge portions are chamfered and rounded, for example, but they do not have to be chamfered.

The ceramic body 11 is made of dielectric ceramic. The ceramic body 11 has first internal electrodes 12 and second internal electrodes 13 that are covered with dielectric ceramic and alternately stacked in the Z-axis direction. The plurality of the internal electrodes 12 and 13 each have a sheet shape extending along the XY plane, and are alternately arranged along the Z-axis direction.

In other words, the ceramic body 11 has an opposing section where the internal electrodes 12 and 13 face each other in the Z-axis direction with ceramic layers 16 interposed therebetween. The first internal electrodes 12 are led out from the opposing section to the first end surface 11a and connected to the first external electrode 14. The second internal electrodes 13 are led out from the opposing section to the second end surface 11b and connected to the second external electrode 15.

With such a configuration, in the multilayer ceramic capacitor 10, when a voltage is applied between the first external electrode 14 and the second external electrode 15, the voltage is applied to the plurality of the ceramic layers 16 in the opposing section of the internal electrodes 12 and 13. As a result, in the multilayer ceramic capacitor 10, electric charge corresponding to the voltage between the first external electrode 14 and the second external electrode 15 is stored.

In the ceramic body 11, dielectric ceramic with a high dielectric constant is used in order to increase the capacitance of each ceramic layer 16 between the internal electrodes 12 and 13. Examples of the dielectric ceramic with a high dielectric constant include, for example, a material having a perovskite structure containing barium (Ba) and titanium (Ti), typified by barium titanate (BaTiO$_3$).

The dielectric ceramic may be strontium titanate (SrTiO$_3$), calcium titanate (CaTiO$_3$), magnesium titanate (MgTiO$_3$), calcium zirconate (CaZrO$_3$), calcium zirconate titanate (Ca(Zr, Ti)O$_3$), barium zirconate (BaZrO$_3$), or titanium oxide (TiO$_2$).

The first external electrode 14 is disposed on the surface of the ceramic body 11 and covers the first end surface 11a. The second external electrode 15 is disposed on the surface of the ceramic body 11 and covers the second end surface 11b. The external electrodes 14 and 15 face each other in the X-axis direction with the ceramic body 11 interposed therebetween, and function as terminals of the multilayer ceramic capacitor 10.

The external electrodes 14 and 15 extend inward in the X-axis direction from the end surfaces 11a and 11b of the ceramic body 11 along the principal surfaces 11e and 11f and the side surfaces 11c and 11d, respectively, and are spaced apart from each other on each of the principal surfaces 11e and 11f and the side surfaces 11c and 11d.

The shapes of the external electrodes 14 and 15 are not limited to those illustrated in FIG. 1 and FIG. 2. For example, the external electrodes 14 and 15 may extend from the respective end surfaces 11a and 11b of the ceramic body 11 to only one principal surface, and have an L-shaped cross section parallel to the X-Z plane. Alternatively, the external electrodes 14 and 15 do not have to extend to any of the principal surfaces and side surfaces.

The first external electrode 14 has a five-layer structure and includes a base film 140, a first Ni film 141, a metal film 142, a second Ni film 143, and a surface layer film 144. In the first external electrode 14, the base film 140, the first Ni film 141, the metal film 142, the second Ni film 143, and the surface layer film 144 are stacked in this order from the ceramic body 11 side.

The second external electrode 15 has a five-layer structure and includes a base film 150, a first Ni film 151, a metal film 152, a second Ni film 153, and a surface layer film 154. In the second external electrode 15, the base film 150, the first Ni film 151, the metal film 152, the second Ni film 153, and the surface layer film 154 are stacked in this order from the ceramic body 11 side.

The base films 140 and 150 are formed of a conductive material. For example, the base films 140 and 150 may contain copper (Cu), nickel (Ni), silver (Ag), gold (Au), platinum (Pt), palladium (Pd), titanium (Ti), tantalum (Ta), tungsten (W) or the like as a main component. As an example, the base films 140 and 150 may contain Cu as a main component. The main component refers to the component with the highest content molar ratio.

The base films 140 and 150 can be configured, for example, as at least one layer of sputtered film formed by sputtering, or at least one layer of baked film obtained by baking a conductive paste. Alternatively, the base films 140 and 150 may be formed of combination of a sputtered film and a baked film.

The first Ni films 141 and 151 are plating films formed by electrolytic plating, and are disposed on the base films 140 and 150, respectively. The first Ni films 141 and 151 contain Ni as a main component. The first Ni films 141 and 151 are films subjected to heat treatment, and contain recrystallized grains of a metal or alloy containing Ni as a main component, as will be described later in detail.

The metal films 142 and 152 are disposed on the first Ni films 141 and 151, respectively. The metal films 142 and 152 contain a metal having a lower ionization tendency than Ni as a main component. Specifically, the metal films 142 and 152 preferably contain at least one of Pd, Pt, Ag, Cu or Sn as a main component. The metal films 142 and 152 can be configured, for example, as plating films formed by electrolytic plating or electroless plating, sputtered films formed by sputtering, or the like. The metal films 142 and 152 are formed before the heat treatment and have a function of preventing oxidation of the first Ni films 141 and 151 during the heat treatment.

Note that the external electrodes 14 and 15 may further have reaction layers formed between the first Ni film 141 and the metal film 142 and between the first Ni film 151 and the metal film 152. The reaction layers are formed by reaction between the first Ni film 141 and the metal film 142 and between the first Ni film 151 and the metal film 152 during the heat treatment described above. The reaction layers are configured as alloy layers containing Ni that is contained in the first Ni films 141 and 151 as a main component, and the metal that is contained in the metal films 142 and 152 as a main component.

The second Ni films 143 and 153 are plating films formed by electrolytic plating and disposed on the metal films 142 and 152, respectively. Similarly to the first Ni films 141 and 151, the second Ni films 143 and 153 also contain Ni as a main component. Since the second Ni films 143 and 153 are formed after the heat treatment, they are not subjected to the heat treatment.

The surface layer films 144 and 154 are plating films formed by electrolytic plating, and are disposed on the second Ni films 143 and 153, respectively. The surface layer films 144 and 154 contain, for example, tin (Sn) as a main component. This makes it possible to increase the reactivity between the external electrodes 14 and 15 and the solder when soldering the multilayer ceramic capacitor 10 to a mounting substrate, and to sufficiently bond them.

Configuration of a Circuit Board 100

Figure 4:
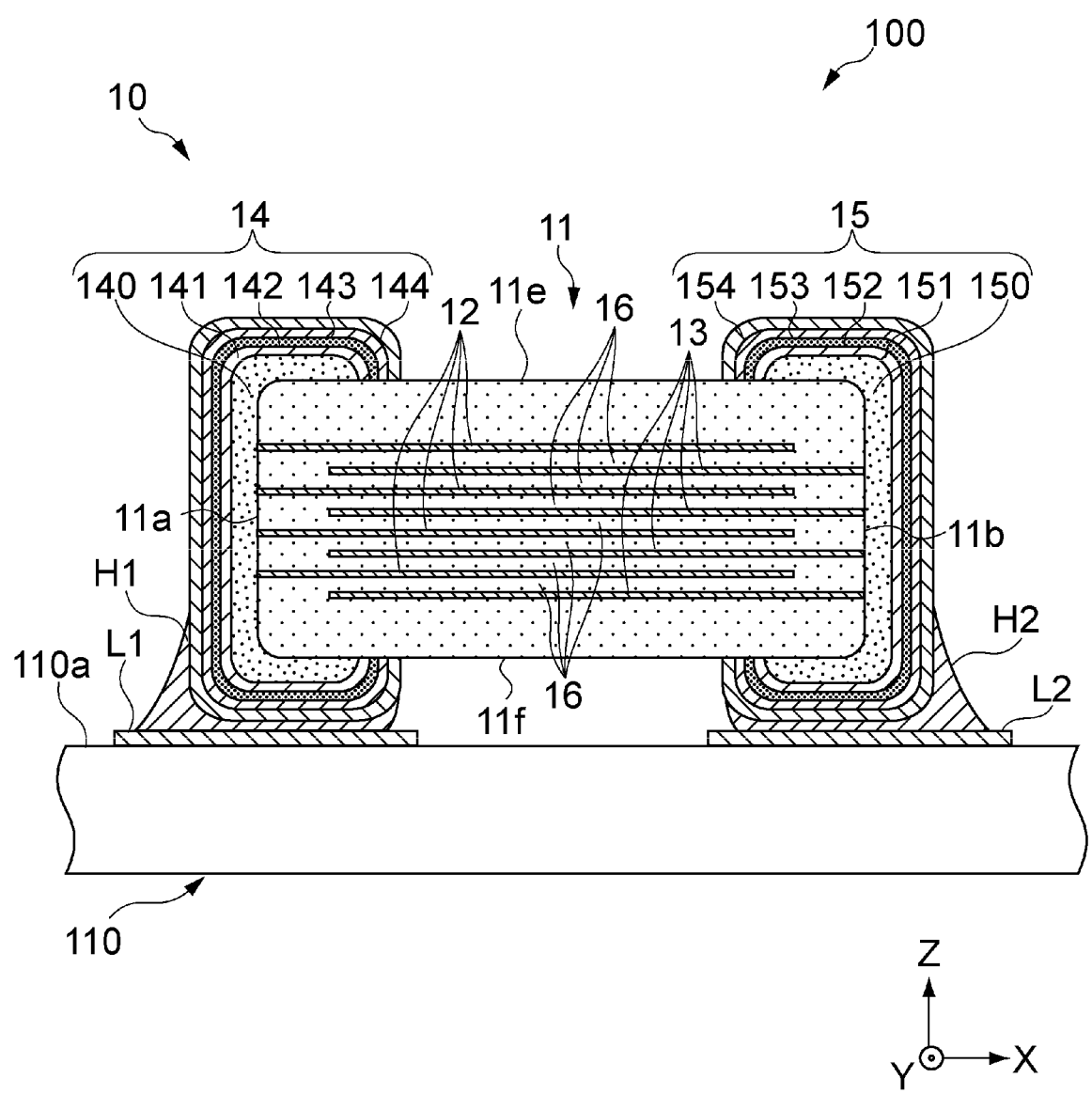
FIG. 4 is a cross-sectional view schematically illustrating a circuit board on which the multilayer ceramic capacitor is mounted.

FIG. 4 is a cross-sectional view illustrating the circuit board 100 of the present embodiment, and illustrates a cross section corresponding to FIG. 2.

As illustrated in FIG. 4, the circuit board 100 includes a mounting substrate 110, the multilayer ceramic capacitor 10, first solder H1, and second solder H2.

The mounting substrate 110 is a substrate on which the multilayer ceramic capacitor 10 is mounted, and a circuit (not illustrated) may be formed thereon. The mounting substrate 110 has a mounting surface 110a facing the multilayer ceramic capacitor 10, and a first land L1 and a second land L2 that are formed on the mounting surface 110a and are to be connected to the multilayer ceramic capacitor 10.

The first solder H1 connects the first land L1 of the mounting substrate 110 and the first external electrode 14. The second solder H2 connects the second land L2 of the mounting substrate 110 and the second external electrode 15. These solders H1 and H2 are formed by, for example, melting the solder pastes applied to the lands L1 and L2 and wetting the external electrodes 14 and 15.

In the multilayer ceramic capacitor 10, the surface layer films 144 and 154 react well with the solder, thereby promoting solder wetting and sufficiently bonding the first solder H1 and the second solder H2 to the external electrodes 14 and 15, respectively.

Also, the wetting of the solder is affected not only by the surface layer films 144 and 154, but also by the surface conditions of the underlying layers. In the present embodiment, by providing the second Ni films 143 and 153 that have not been subjected to the heat treatment under the surface layer films 144 and 154, the wettability of the solder can be maintained satisfactorily.

The detailed effects of the first Ni films 141 and 151, the metal films 142 and 152, and the second Ni films 143 and 153 will be described later.

Manufacturing Method of the Multilayer Ceramic Capacitor 10

Figure 5:
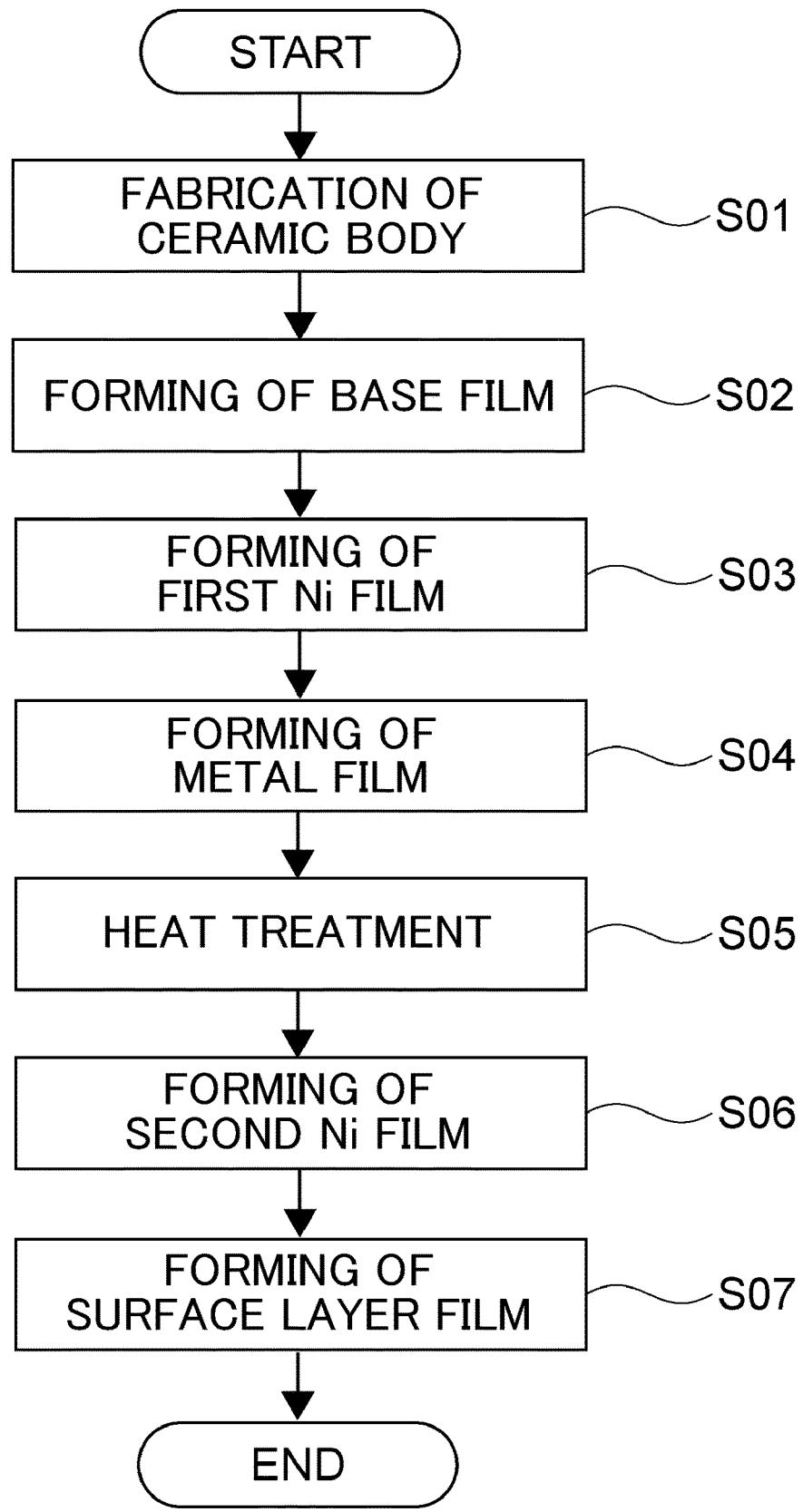
FIG. 5 is a flowchart illustrating a method of manufacturing the multilayer ceramic capacitor.
Figure 6:
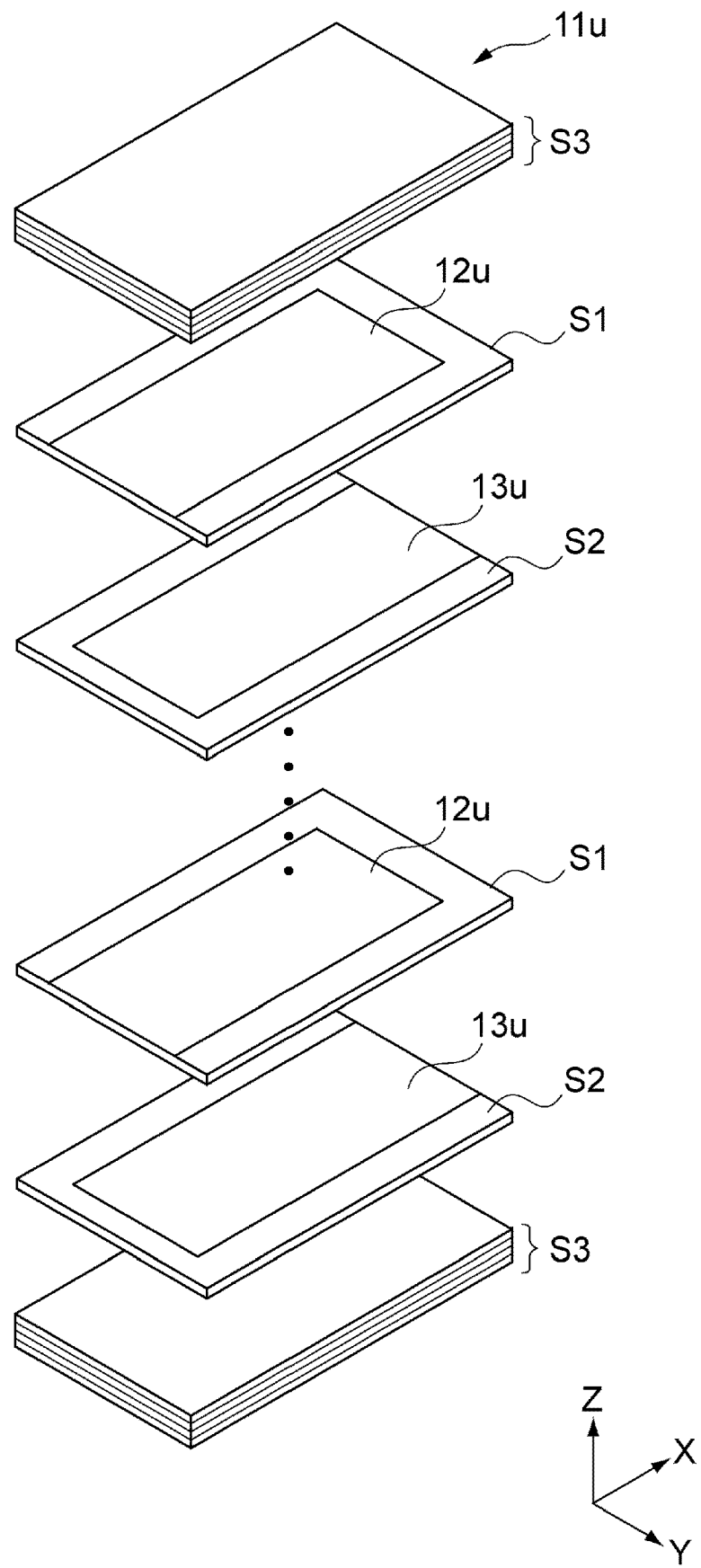
FIG. 6 is a perspective view illustrating a manufacturing process of the multilayer ceramic capacitor.

FIG. 5 is a flowchart illustrating a method of manufacturing the multilayer ceramic capacitor 10. FIG. 6 illustrates a manufacturing process of the multilayer ceramic capacitor 10. A method of manufacturing the multilayer ceramic capacitor 10 will be described along FIG. 5 and with reference to FIG. 6 as appropriate.

(Step S01: Fabrication of the Ceramic Body 11)

In step S01, first ceramic sheets S1, second ceramic sheets S2, and third ceramic sheets S3 are stacked as illustrated in FIG. 6 and then fired to fabricate the ceramic body 11.

The ceramic sheets S1, S2, and S3 are configured as unfired dielectric green sheets containing dielectric ceramic as a main component. An unfired first internal electrodes 12$u$ corresponding to the first internal electrode 12 is formed on the first ceramic sheet S1, and an unfired second internal electrode 13$u$ corresponding to the second internal electrode 13 is formed on the second ceramic sheet S2. No internal electrode is formed on the third ceramic sheet S3.

In the unfired ceramic body 11$u$ illustrated in FIG. 6, the ceramic sheets S1 and S2 are alternately stacked, and the third ceramic sheets S3 are stacked on and under the stacked ceramic sheets S1 and S2 in the Z-axis direction. The unfired ceramic body 11$u$ is integrated by pressure-bonding the ceramic sheets S1, S2, and S3. The number of the ceramic sheets S1, S2, and S3 is not limited to the example illustrated in FIG. 6.

Although the unfired ceramic body 11$u$ corresponding to one ceramic body 11 has been described, in actuality, a multilayer sheet configured as a large-sized sheet that is not separated into individual pieces is formed, and is then separated into individual ceramic bodies 11$u$.

By sintering the unfired ceramic body 11$u$, the ceramic body 11 illustrated in FIG. 1 to FIG. 3 is produced. The firing temperature can be determined based on the sintering temperature of the ceramic body 11$u$. For example, when a barium titanate-based material is used as the dielectric ceramic, the firing temperature can be set to about 1000 to 1300° C. Also, the firing can be performed, for example, in a reducing atmosphere or in a low oxygen partial pressure atmosphere.

(Step S02: Forming of the Base Films 140 and 150)

In step S02, the base films 140 and 150 made of a conductive material are formed on the surface of the ceramic body 11 so as to be connected to the internal electrodes 12 and 13, respectively. The base films 140 and 150 are formed so as to cover the first end surface 11$a$ and the second end surface 11$b$, respectively, in the present embodiment.

The base films 140 and 150 are formed by applying conductive pastes to the end surfaces 11$a$ and 11$b$ of the ceramic body 11 by, for example, dipping, printing, and the like, and then baking the pastes. In this case, the conductive material forming the base films 140 and 150 may contain, for example, Cu, Ni, Ag, Au, Pt, or Pd as a main component.

Alternatively, the base films 140 and 150 may be formed by sputtering. In this case, the conductive material forming the base films 140 and 150 may contain, for example, Ti, Ni, Ag, Au, Pt, Pd, Ta, or W as a main component.

The thickness of each of the base films 140 and 150 is 2 μm or greater and 50 μm or less. This configuration allows the end surfaces 11$a$ and 11$b$ to be reliably covered with the base films 140 and 150, respectively, and reduces the size of the multilayer ceramic capacitor 10. The thickness of each of the base films 140 and 150 is, for example, the thickness in each of the regions on the end surfaces 11$a$ and 11$b$, and can be the dimension along the X-axis direction of the central portion of each of the base films 140 and 150 in the Z-axis direction and the Y-axis direction.

(Step S03: Forming of the First Ni Films 141 and 151)

In step S03, the first Ni films 141 and 151 are formed on the base films 140 and 150, respectively. The first Ni films 141 and 151 contain Ni as a main component and are formed by electrolytic plating.

(Step S04: Forming of the Metal Films 142 and 152)

In step S04, the metal films 142 and 152 are formed on the first Ni films 141 and 151, respectively. The metal films 142 and 152 mainly contain a metal having a lower ionization tendency than Ni, and are formed by electrolytic plating, electroless plating, sputtering, or the like, for example.

(Step S05: Heat Treatment)

In step S05, heat treatment is performed in a state in which the metal films 142 and 152 are formed on the first Ni films 141 and 151. This heat treatment can prevent oxidation of the first Ni films 141 and 151 covered with the metal films 142 and 152. The heat treatment is performed in a weakly oxidizing atmosphere or a reducing atmosphere. In the present embodiment, a weakly oxidizing atmosphere or a reducing atmosphere means an atmosphere with an oxygen concentration of 30 ppm or less. This configuration further inhibits oxidation of the surfaces of the metal films 142 and 152, which contain a metal having a lower ionization tendency than Ni as a main component and are originally difficult to oxidize. The heat treatment temperature is preferably equal to or higher than the temperature at which the first Ni films 141 and 151 are recrystallized. The heat treatment time can be, for example, 5 minutes or greater and 30 minutes or less.

In step S05, the first Ni films 141 and 151 and the metal films 142 and 152 react with each other, so that the reaction layers containing Ni, which is contained in the first Ni films 141 and 151 as a main component, and the metal that is contained in the metal film 142 and 152 as a main component, may be formed between the first Ni films 141 and the metal film 142 and between the first Ni film 151 and the metal film 152. By forming the reaction layer, the bonding strength between the first Ni films 141 and 151 and the metal films 142 and 152 can be improved.

(Step S06: Forming of the Second Ni Films 143 and 153)

In step S06, the second Ni films 143 and 153 are formed on the metal films 142 and 152, respectively, after the heat treatment in step S05. The second Ni films 143 and 153 contain Ni as a main component and are formed by electrolytic plating.

(Step S07: Forming of the Surface Layer Films 144 and 154)

In step S07, the surface layer films 144 and 154 are formed on the second Ni films 143 and 153, respectively. The surface layer films 144 and 154 contain Sn as a main component, for example, and are formed by electrolytic plating.

The thickness of each of the surface layer films 144 and 154 is 3 μm or greater and 10 μm or less. This configuration reduces the size of the multilayer ceramic capacitor 10 while ensuring sufficient reactivity with the solder. The thickness of each of the surface layer films 144 and 154 is, for example, the thickness in each of the regions on the end surfaces 11$a$ and 11$b$, and can be the dimension along the X-axis direction of the central portion of each of the surface layer films 144 and 154 in the Z-axis direction and the Y-axis direction.

Through the above steps, the multilayer ceramic capacitor 10 is manufactured.

Detailed Description of the External Electrodes 14 and 15

In the plating process using an electrolytic plating method for forming the first Ni films 141 and 151, the metal films 142 and 152, the second Ni films 143 and 153, and the surface layer films 144 and 154, hydrogen having a strong effect to deteriorate the ceramic body 11 is generated. Hydrogen generated in the plating process is easily occluded in the base films 140 and 150, the first Ni films 141 and 151, the metal films 142 and 152, the second Ni films 143 and 153, and the surface layer films 144 and 154 of the external electrodes 14 and 15.

When the diffusion of the hydrogen occluded in the external electrodes 14 and 15 into the ceramic body 11 progresses to the opposing section of the internal electrodes 12 and 13, the insulation resistance of the ceramic layer 16 between the internal electrodes 12 and 13 decreases. As a result, in the multilayer ceramic capacitor 10, an insulation failure is likely to occur, and thus reliability is reduced.

The hydrogen occluded in the external electrodes 14 and 15 is not limited to hydrogen generated in the plating process, and may be, for example, hydrogen contained in moisture such as water vapor in the atmosphere. Moreover, the hydrogen occluded in the external electrodes 14 and 15 may be in any possible state of hydrogen, such as a hydrogen atom, a hydrogen ion, or a hydrogen isotope.

In the present embodiment, the heat treatment in step S05 is performed after the metal films 142 and 152 are formed in step S04. As a result, the hydrogen occluded in the ceramic body 11, the base films 140 and 150, the first Ni films 141 and 151, and the metal films 142 and 152 is released to the outside and removed.

Furthermore, this heat treatment promotes recrystallization of the first Ni films 141 and 151, and the first Ni films 141 and 151 become structures that inhibit diffusion of hydrogen. That is, the first Ni films 141 and 151 contain recrystallized structures. As a result, even if hydrogen is generated during the formation of the second Ni films 143 and 153 and the surface layer films 144 and 154, the diffusion of the hydrogen is inhibited by the first Ni films 141 and 151, and the penetration of hydrogen into the ceramic body 11 is prevented. In addition, hydrogen is prevented from entering from the outside of the multilayer ceramic capacitor 10. Therefore, in the multilayer ceramic capacitor 10, the diffusion of hydrogen into the ceramic body 11 is inhibited.

The recrystallized structure of the first Ni films 141 and 151 can be confirmed as a crystal structure with fewer dislocations and fewer lattice defects than the second Ni films 143 and 153. The recrystallized structure of the first Ni films 141 and 151 has larger crystal grains than those of the second Ni films 143 and 153. As a method for confirming these crystal structures, for example, a method in which the target surface is chemically polished and then observed with an optical microscope or scanning electron microscope (SEM) at a magnification of 500 to 5000 can be used.

For example, the recrystallized structure of the first Ni films 141 and 151 can be verified as follows. First, the structures of the first Ni films 141 and 151 and the second Ni films 143 and 153 are checked, and then the second Ni films 143 and 153 are subjected to heat treatment similar to step S04 (referred to as verification heat treatment), and the structures of the second Ni films 143 and 153 after the verification heat treatment are compared with the structures of the first Ni films 141 and 151 before the verification heat treatment. When the structures of the second Ni films 143 and 153 after the verification heat treatment have changed to the same structure as the structures of the first Ni films 141 and 151 before the verification heat treatment, it can be confirmed that the first Ni films 141 and 151 were caused to have a recrystallized structure by the heat treatment in step S04.

That is, in the present embodiment, the release of the hydrogen occluded in the ceramic body 11, the base films 140 and 150, the first Ni films 141 and 151, and the metal films 142 and 152 and formation of the diffusion suppression layer, which are the recrystallized first Ni films 141 and 151, for suppressing the diffusion of hydrogen are performed in the same heat treatment process. Therefore, it is possible to obtain a configuration that is less likely to be adversely affected by hydrogen while minimizing the heat load on the ceramic body 11 and the like due to the release of hydrogen and the formation of the diffusion suppression layer.

The thickness of each of the first Ni films 141 and 151 is, for example, 1.0 μm or greater and 10.0 μm or less, more preferably 1.0 μm or greater and 4.5 μm or less. The thickness of each of the first Ni films 141 and 151 is, for example, the thickness in each of the regions on the end surfaces 11a and 11b, and can be the dimension along the X-axis direction of the central portion of each of the first Ni films 141 and 151 in the Z-axis direction and the Y-axis direction.

By adjusting the thickness of each of the first Ni films 141 and 151 to be 1.0 μm or greater, the first Ni films 141 and 151 sufficiently cover the base films 140 and 150, thereby effectively suppressing diffusion of hydrogen. In addition, the components of the base films 140 and 150 are less likely to diffuse to the surfaces of the first Ni films 141 and 151, and the adhesion between the surfaces of the first Ni films 141 and 151 and the second Ni films 143 and 153 is enhanced. By adjusting the thickness of each of the first Ni films 141 and 151 to be 10.0 μm or less, the amount of hydrogen generated by the formation of the first Ni films 141 and 151 can be reduced, and the heat treatment conditions for releasing hydrogen can be relaxed. Furthermore, by adjusting the thickness of each of the first Ni films 141 and 151 to be 4.5 μm or less, the thickness of each of the external electrodes 14 and 15 can be reduced, and miniaturization of the multilayer ceramic capacitor 10 can be achieved.

Here, if heat treatment is performed while the surfaces of the first Ni films 141 and 151 are exposed, oxide films are likely to be formed on the surfaces of the first Ni films 141 and 151, and the surfaces of the first Ni films 141 and 151 are likely to be in an unstable state. If the surface layer films 144 and 154 are directly formed on such first Ni films 141 and 151, the wettability of the solder may be lowered in the mounting process using solder, and good bonding by solder is not obtained.

Further, if the second Ni films 143 and 153 are directly formed on the unstable surfaces of the first Ni films 141 and 151, the adhesion of the second Ni films 143 and 153 to the first Ni films 141 and 151 is lowered, and defects such as peeling may occur between the first Ni films 141 and 151 and the second Ni films 143 and 153.

Therefore, in the present embodiment, the metal films 142 and 152 are formed on the first Ni films 141 and 151 before the heat treatment, and the second Ni films 143 and 153 are formed on the metal films 142 and 152 after the heat treatment. As a result, the second Ni films 143 and 153, which are less affected by oxidation, are disposed on the surface layer side, thereby suppressing deterioration in wettability of solder. In addition, the action of the metal films 142 and 152 can prevent occurrence of problems such as peeling between the first Ni films 141 and 151 and the second Ni films 143 and 153.

Further, since the surface layer films 144 and 154 are formed on the second Ni films 143 and 153, which are less affected by oxide films and the like, the adhesion between the second Ni films 143 and 153 and the surface layer films 144 and 154 can be sufficiently secured. As a result, the adhesion between the plating films of the external electrodes 14 and 15 can be enhanced, and peeling of the plating films can be prevented.

The thickness of each of the metal films 142 and 152 is, for example, 0.1 μm or greater and 1.0 μm or less. The thickness of each of the metal films 142 and 152 is, for example, the thickness in each of the regions on the end surfaces 11a and 11b, and can be the dimension along the X-axis direction of the central portion of each of the metal films 142 and 152 in the Z-axis direction and the Y-axis direction.

By adjusting the thickness of each of the metal films 142 and 152 to be 0.1 μm or greater, the function of preventing oxidation of the first Ni films 141 and 151 during the heat treatment of the metal films 142 and 152 can be effectively obtained. By adjusting the thickness of each of the metal films 142 and 152 to be 1.0 μm or less, generation of gaps between the first Ni films 141 and 151 and the second Ni films 143 and 153 when solder is melted during mounting is reduced.

The heat treatment reduces the hydrogen concentration of the first Ni films 141 and 151. On the other hand, the second Ni films 143 and 153 occlude hydrogen generated in the plating process after the heat treatment. Therefore, the hydrogen concentration of the second Ni films 143 and 153 is higher than the hydrogen concentration of the first Ni films 141 and 151. The hydrogen concentration can be the concentration (mol %) of hydrogen when Ni or its alloy, which is the main component of the Ni film, is defined as 100 mol %.

For example, secondary ion mass spectrometry (SIMS) is used to measure the hydrogen concentration. As a sample for measuring the hydrogen concentration, for example, the multilayer ceramic capacitor 10 cut parallel to the XZ plane can be used. The cross section of the sample is subjected to, for example, mirror polishing using diamond paste or the like so as to obtain sufficient smoothness for measurement.

The thickness of each of the second Ni films 143 and 153 is, for example, 0.5 μm or greater and 10.0 μm or less. The thickness of each of the second Ni films 143 and 153 is, for example, the thickness in each of the regions on the end surfaces 11a and 11b, and can be the dimension along the X-axis direction of the central portion of each of the second Ni films 143 and 153 in the Z-axis direction and the Y-axis direction.

By adjusting the thickness of each of the second Ni films 143 and 153 to be 0.5 μm or greater, the second Ni films 143 and 153 sufficiently cover the heat-treated metal films 142 and 152. As a result, the wettability of the solder during mounting can be sufficiently ensured, and the adhesion of the surface layer films 144 and 154 can be enhanced. By adjusting the thickness of each of the second Ni films 143 and 153 to be 10.0 μm or less, the thickness of each of the external electrodes 14 and 15 can be reduced, and miniaturization of the multilayer ceramic capacitor 10 can be achieved. Also, the total thickness of the first Ni film 141 and the second Ni film 143 and the total thickness of the first Ni film 151 and the second Ni film 153 are preferably 3.0 μm or greater, for example.

Other Embodiments

Although the embodiments of the present invention have been described above, the present invention is not limited to the above-described embodiments, and various modifications can be made without departing from the scope of the present invention.

For example, the structure of the external electrode is not limited to a five-layer structure, and may be a structure having six or more layers.

In addition, the present embodiment is applicable not only to multilayer ceramic capacitors, but also to multilayer ceramic electronic components in general that have external electrodes. Examples of multilayer ceramic electronic components to which the present embodiment is applicable include, in addition to multilayer ceramic capacitors, chip varistors, chip thermistors, multilayer inductors, and the like.

What is claimed is:

1. A multilayer ceramic electronic component comprising:
a ceramic body that has a plurality of internal electrodes stacked in a direction of a first axis, and end surfaces perpendicular to a second axis orthogonal to the first axis, the plurality of internal electrodes being alternately led out to the end surfaces; and
external electrodes covering the end surfaces of the ceramic body, respectively,
wherein each of the external electrodes includes:
a base film formed on a corresponding one of the end surfaces and connected to the plurality of internal electrodes that are led out to the corresponding end surface,
a first Ni film formed on the base film,
a metal film that is formed on the first Ni film and contains a metal having a lower ionization tendency than Ni, as a main component,
a second Ni film formed on the metal film and having a hydrogen concentration higher than that of the first Ni film, and
a surface layer film formed on the second Ni film.

2. The multilayer ceramic electronic component according to claim 1, wherein the metal film contains at least one of Pd, Pt, Au, Ag, Cu, or Sn as a main component.

3. The multilayer ceramic electronic component according to claim 1, wherein each of the external electrodes further includes a reaction layer that is formed between the first Ni film and the metal film and contains Ni and the metal contained in the metal film as a main component.

4. The multilayer ceramic electronic component according to claim 1, wherein the thickness of the metal film is 0.1 μm or greater and 1.0 μm or less.

5. The multilayer ceramic electronic component according to claim 1, wherein the thickness of the first Ni film is 1.0 μm or greater and 10.0 μm or less.

6. The multilayer ceramic electronic component according to claim 1, wherein the thickness of the second Ni film is 0.5 μm or greater and 10.0 μm or less.

7. The multilayer ceramic electronic component according to claim 1, wherein the base film contains Cu as a main component.

8. The multilayer ceramic electronic component according to claim 1, wherein the thickness of the base film is 2 μm or greater and 50 μm or less.

9. The multilayer ceramic electronic component according to claim 1, wherein the surface layer film contains Sn as a main component.

10. The multilayer ceramic electronic component according to claim 1, wherein the thickness of the surface layer film is 3 μm or greater and 10 μm or less.

11. A method of manufacturing a multilayer ceramic electronic component, the method comprising: preparing a ceramic body having a plurality of internal electrodes stacked in a direction of a first axis, and end surfaces perpendicular to a second axis orthogonal to the first axis, the plurality of internal electrodes being alternately led out to the end surfaces; forming a base film on each of the end surfaces so as to be connected to the plurality of internal electrodes that are led out to the corresponding end surface; forming a first Ni film on the base film by electrolytic plating; forming a metal film on the first Ni film, the metal film containing a metal having a lower ionization tendency than Ni as a main component; forming a second Ni film on the metal film by electrolytic plating; and forming a surface layer film on the second Ni film, wherein before the forming of the second Ni film, the ceramic body on which the metal film is formed is subjected to heat treatment, in a weakly oxidizing atmosphere or a reducing atmosphere, at a temperature equal to or higher than a temperature at which the first Ni film is recrystallized, and the second Ni film has a hydrogen concentration higher than that of the first Ni film.

12. The method according to claim 11, wherein the temperature of the heat treatment is 450° C. or higher and 800° C. or lower.

13. A circuit board comprising:
a mounting substrate;
a multilayer ceramic electronic component that includes:
   a ceramic body having a plurality of internal electrodes stacked in a direction of a first axis, and end surfaces perpendicular to a second axis orthogonal to the first axis, the plurality of internal electrodes being alternately led out to the end surfaces, and
   external electrodes covering the end surfaces of the ceramic body, respectively; and
solder that connects the external electrodes to the mounting substrate,
wherein each of the external electrodes includes:
   a base film formed on a corresponding one of the end surfaces and connected to the plurality of internal electrodes that are led out to the corresponding end surface,
   a first Ni film formed on the base film,
   a metal film that is formed on the first Ni film and contains a metal having a lower ionization tendency than Ni, as a main component,
   a second Ni film that is formed on the metal film and has a hydrogen concentration higher than that of the first Ni film, and
   a surface layer film formed on the second Ni film.

* * * * *